United States Patent [19]

Branan, Jr. et al.

[11] Patent Number: 5,232,974

[45] Date of Patent: Aug. 3, 1993

[54] LOW ROLLING RESISTANCE/HIGH TREADWEAR RESISTANCE CARBON BLACKS

[75] Inventors: John M. Branan, Jr., Amarillo, Tex.; Chiung-Huei Shieh, Lexington; Myles L. Mace, Jr., Dover, both of Mass.

[73] Assignee: Cabot Corporation, Boston, Mass.

[21] Appl. No.: 797,037

[22] Filed: Nov. 25, 1991

[51] Int. Cl.$^5$ .................................................. C09C 1/48
[52] U.S. Cl. .................................. 524/495; 423/449.1
[58] Field of Search ............................. 423/445, 449.1; 524/495

[56] References Cited

U.S. PATENT DOCUMENTS

| | | | |
|---|---|---|---|
| 4,075,157 | 2/1978 | Johnson | 423/445 |
| 4,228,143 | 10/1980 | Cheng et al. | 423/445 |
| 4,540,560 | 9/1985 | Henderson et al. | 423/445 |
| 4,548,980 | 10/1985 | Nagata et al. | 423/445 |

OTHER PUBLICATIONS

ASTM D 1765-89, p. 316 of ASTM 1989 handbook.

*Primary Examiner*—Michael Lewis
*Assistant Examiner*—Stuart L. Hendrickson
*Attorney, Agent, or Firm*—Lawrence A. Chaletsky; Harry J. Gwinnell

[57] ABSTRACT

Carbon blacks having a having a CTAB of 95-120 m$^2$/g, a CDBP of 106-120 cc/100 g, a Tint/CTAB ratio of 0.90-1.10, a Skewness D$_c$ of 1.30-1.80 and a Skewness P$_s$ of 1.00-1.50. Also disclosed are rubber compounds containing the carbon blacks which exhibit increased abrasion resistance, lower heat build-up and reduced rolling resistance.

10 Claims, 3 Drawing Sheets

LOW ROLLING RESISTANCE/HIGH TREADWEAR RESISTANCE CARBON BLACKS

FIELD OF THE INVENTION

The present invention relates to a class of new and novel furnace carbon blacks that impart low hysteresis and high abrasion resistance to rubber compounds. The carbon blacks are particularly well suited for use in rubber compounds intended for use in tires.

BACKGROUND

Carbon blacks are generally produced in a furnace-type reactor by pyrolyzing a hydrocarbon feedstock with hot combustion gases to produce combustion products containing particulate carbon black.

Carbon blacks are generally characterized on the basis of analytical properties including, but not limited to, surface area, surface chemistry, aggregate size, and particle size. The properties of carbon blacks are analytically determined by tests known to the art, including, for example cetyl-trimethyl ammonium bromide absorption value (CTAB), dibutyl phthalate adsorption value of the crushed carbon black (CDBP) and Tinting strength value (TINT). Carbon blacks may also be characterized by Skewness $D_c$ and Skewness $P_s$. "Skewness" measures the degree of asymmetry of data around the sample mean. The skewness of the distribution of the values of $D_c$ (Skewness $D_c$) and the skewness of the distribution of the values of $P_s$ (Skewness $P_s$) are determined by known techniques that are described herein.

Carbon blacks may be utilized as pigments, fillers, reinforcing agents and for a variety of other applications. For example, carbon blacks are widely utilized as fillers and reinforcing pigments in the compounding and preparation of rubber and plastic compounds. More particularly, carbon blacks are effective in the preparation of rubber vulcanizates intended for usage in preparing tires.

It is generally understood that the properties of a carbon black affect the properties of rubber or plastic compounds containing the carbon black. Thus, the properties of a carbon black will affect the properties of rubber tire tread compounds that incorporate the carbon blacks.

It is generally desirable in the production of tires to utilize carbon black containing tire tread compounds which have satisfactory abrasion resistance and hysteresis. The greater the abrasion resistance of a tire, the greater the number of miles the tire will last before wearing out. The hysteresis of a rubber compound means the energy dissipated under a deformation cycle. Tire tread compounds with lower hysteresis values will have reduced rolling resistance which results in reduced fuel consumption by the vehicle utilizing the tire. The rebound of a rubber compound refers to the compound elasticity. In comparison with generally utilized compounds, tire tread compounds with higher rebound values will have reduced rolling resistance and lower heat build-up. Thus, for all of these reasons, it is particularly desirable to produce carbon blacks capable of imparting greater abrasion resistance and lower hysteresis to tire compounds.

Accordingly, an object of the present invention is the production of new carbon blacks which impart increased abrasion resistance, lower hysteresis and higher rebound to natural rubbers, synthetic rubbers and blends of natural and synthetic rubbers incorporating the carbon blacks.

Another object of the present invention is new rubber compounds, advantageous for use in all season tires, touring tires and high performance tires for passenger vehicles and for use in light and medium truck tires.

Other objects of the present invention will become apparent from the following description and the claims.

SUMMARY OF THE INVENTION

We have discovered new carbon blacks having a CTAB (cetyl-trimethyl ammonium bromide absorption value) of 95–120 $m^2/g$ (square meters per gram), a CDBP (crushed dibutyl phthalate number) of 106–120 cc/100 g (cubic centimeters dibutyl phthalate per 100 grams carbon black), a Tint/CTAB ratio of 0.90–1.10, a Skewness $D_c$ of 1.30–1.80 and a Skewness $P_S$ of 1.00–1.50. Preferably, the carbon blacks have a CTAB of 100–118 $m^2/g$, a CDBP of 110–115 cc/100 g, a Tint/CTAB ratio of 0.95–1.06, a Skewness $D_c$ of 1.40–1.70 and a Skewness $P_s$ of 1.10–1.40. More preferably the carbon blacks have a CTAB of 100–105 $m^2/g$, a CDBP of 110–115 cc/100 g, a Tint/CTAB ratio of 1.0–1.1, a Skewness $D_c$ of 1.50–1.70 and a Skewness $P_s$ of 1.15–1.35 or have a CTAB of 114–120 $m^2/g$, a CDBP of 109–115 cc/100 g, a Tint/CTAB ratio of 1.0–1.06, a Skewness $D_c$ of 1.47–1.67 and a Skewness $P_s$ of 1.10–1.30.

We have also discovered a new class of rubber compounds containing the carbon blacks.

The carbon blacks of the present invention may be produced in a furnace carbon black reactor having a first (combustion) zone, a transition zone, and a reaction zone. A carbon black yielding feedstock is injected in any manner known to the art, into a hot combustion gas stream. The resultant mixture of hot combustion gases and feedstock passes into the reaction zone. Pyrolysis, of the carbon black yielding feedstock, is stopped by quenching the mixture when the carbon blacks of the present invention have been formed. Preferably pyrolysis is stopped by a quench injecting a quenching fluid. The process for preparing the novel carbon black of the present invention will be described in greater detail hereinafter.

The rubbers for which the novel carbon black of this invention are effective as reinforcing agents include natural and synthetic rubbers. Generally, amounts of the carbon black product ranging from about 10 to about 250 parts by weight can be used for each 100 parts by weight of rubber in order to impart a significant degree of reinforcement thereto. It is, however, preferred to use amounts varying from about 20 to about 100 parts by weight of carbon black per 100 parts by weight of rubber and especially preferred is the utilization of from about 40 to about 80 parts of carbon black per 100 parts of rubber.

Among the rubbers suitable for use with the present invention are natural rubber and its derivatives such as chlorinated rubber, copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene.

An advantage of the carbon black of the present invention is that the carbon blacks impart greater abrasion resistance, lower hysteresis and higher rebound to compounds containing natural rubbers, synthetic rubbers or blends thereof in which the carbon blacks of the present invention are incorporated.

An advantage of the rubber compounds of the present invention is that the rubber compounds are particularly well suited for use in producing passenger car tires having a higher level of treadwear resistance, lower rolling resistance resulting in better fuel economy characteristics and lower heat build-up resulting in longer life when compared with rubber compounds incorporating conventional, commercially available, carbon blacks. These characteristics of tires are particularly advantageous in all season tires, touring tires, and high performance tires for passenger vehicles and in light and medium truck tires.

Other advantages of the present invention will become apparent from the following more detailed description of the invention.

DETAILED DESCRIPTION OF THE INVENTION

Figure 1:
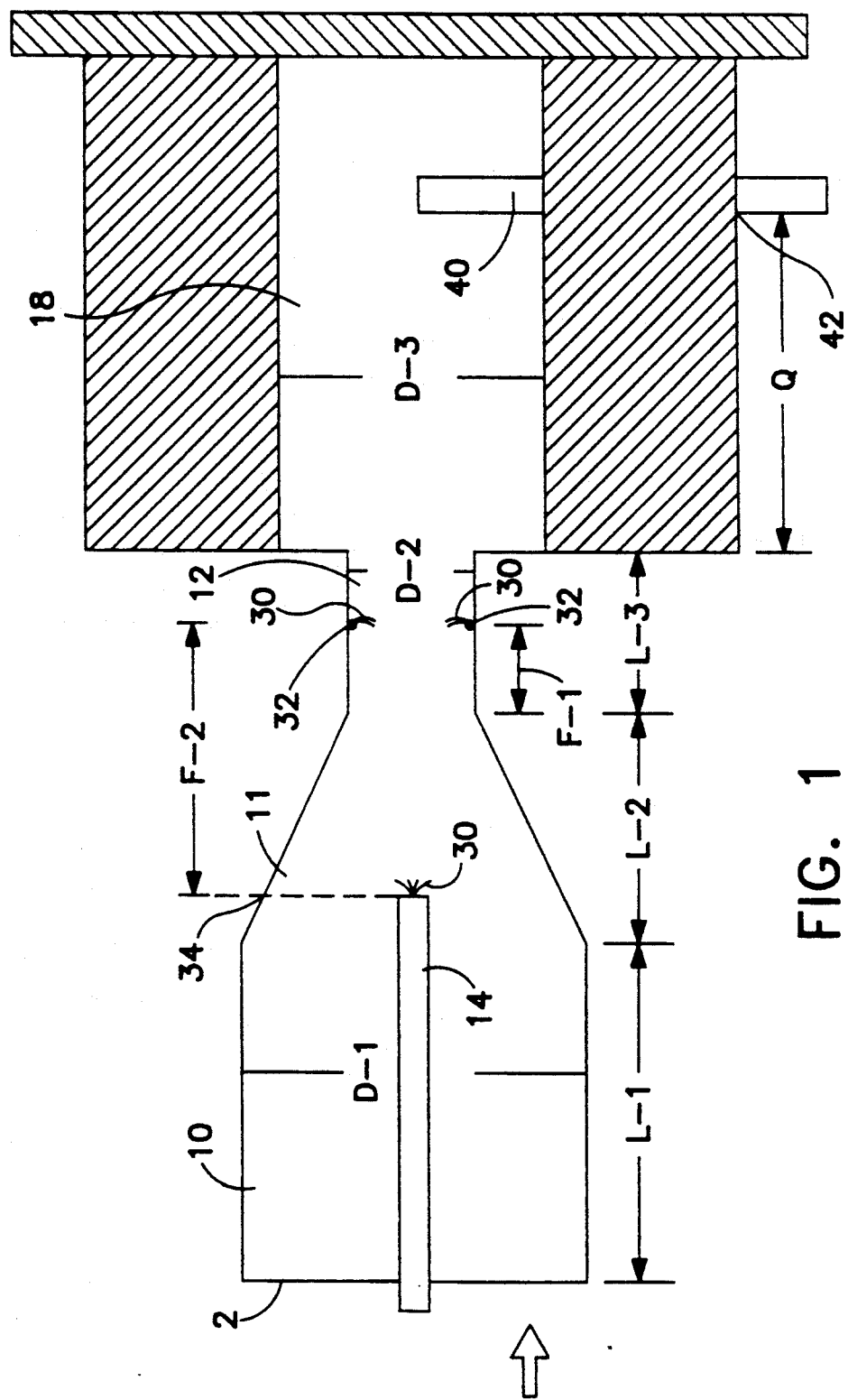
FIG. 1 is a cross-sectional view of a portion of one type of furnace carbon black reactor which may be utilized to produce the carbon blacks of the present invention.

The carbon blacks of the present invention are characterized by the following combination of analytical properties:

$95 \text{ m}^2/\text{g} \leq \text{CTAB} \leq 120 \text{ m}^2/\text{g}$ $106 \text{ cc}/100 \text{ g} \leq \text{CDBP} \leq 120 \text{ cc}/100 \text{ g}$ $0.90 \leq \text{Tint}/\text{CTAB} \leq 1.10$ $1.30 \leq \text{Skewness } D_c \leq 1.80$ $1.00 \leq \text{Skewness } P_s \leq 1.50.$ Preferably, the carbon blacks of the present invention have the following combination of properties:

$100 \text{ m}^2/\text{g} \leq \text{CTAB} \leq 118 \text{ m}^2/\text{g}$ $110 \text{ cc}/100 \text{ g} \leq \text{CDBP} \leq 115 \text{ cc}/100 \text{ g}$ $0.95 \leq \text{Tint}/\text{CTAB} \leq 1.06$ $1.40 \leq \text{Skewness } D_c \leq 1.70$ $1.10 \leq \text{Skewness } P_s \leq 1.40.$ More preferably, the carbon blacks of the present invention have the following combination of properties:

$100 \text{ m}^2/\text{g} \leq \text{CTAB} \leq 105 \text{ m}^2/\text{g}$ $110 \text{ cc}/100 \text{ g} \leq \text{CDBP} \leq 115 \text{ cc}/100 \text{ g}$ $1.0 \leq \text{Tint}/\text{CTAB} \leq 1.1$ $1.50 \leq \text{Skewness } D_c \leq 1.70$ $1.15 \leq \text{Skewness } P_s \leq 1.35$ or have the following combination of properties:

$114 \text{ m}^2/\text{g} \leq \text{CTAB} \leq 120 \text{ m}^2/\text{g}$ $109 \text{ cc}/100 \text{ g} \leq \text{CDBP} \leq 115 \text{ cc}/100 \text{ g}$ $1.0 \leq \text{Tint}/\text{CTAB} \leq 1.06$ $1.47 \leq \text{Skewness } D_c \leq 1.67$ $1.10 \leq \text{Skewness } P_s \leq 1.30.$ The carbon blacks of the present invention may be produced in a modular, also referred to as "staged", furnace carbon black reactor. A section of a typical modular furnace carbon black reactor which may be utilized to produce the carbon black of the present invention is depicted in FIG. 1. Other details of a typical modular furnace carbon black reactor may be found for example in the description contained in U.S. Pat. No. 3,922,335, the disclosure of which is herein incorporated by reference.

Referring to FIG. 1, the carbon blacks of the present invention may be produced in a furnace carbon black reactor 2, having a combustion zone 10, which has a zone of converging diameter 11, transition zone 12, and reaction zone 18. The diameter of the combustion zone 10, up to the point where the zone of converging diameter 11, begins is shown as D-1; the diameter of zone 12, as D-2; and the diameter of zone 18, as D-3. The length of the combustion zone 10, up to the point where the zone of converging diameter 11, begins is shown as L-1; the length of the zone of converging diameter is shown as L-2; and the length of the transition zone is shown as L-3.

To produce the carbon blacks of the present invention hot combustion gases are generated in combustion zone 10, by reacting a liquid or gaseous fuel with a suitable oxidant stream such as air, oxygen, mixtures of air and oxygen or the like. Among the fuels suitable for use in reacting with the oxidant stream in combustion zone 10, to generate the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. The ratio of air to natural gas utilized to produce the carbon blacks of the present invention may be from about 10:1 to about 30:1. To facilitate the generation of hot combustion gases, the oxidant stream may be preheated.

The hot combustion gas stream flows downstream from zones 10 and 11 into zones 12 and then 18. The direction of the flow of hot combustion gases is shown in the figure by the arrow. Carbon black-yielding feedstock 30, is introduced at point 32 (located in zone 12). Carbon black-yielding feedstock 30, is simultaneously introduced upstream through probe 14 at point 34. Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and volatilized hydrocarbons such as kerosenes, naphthalenes, terpenes, ethylene tars, aromatic cycle stocks and the like.

The distance from the end of the zone of converging diameter 11, downstream to point 32, is shown as F-1 and the distance from point 34 downstream to point 32 is shown as F-2. To produce the carbon black of the present invention, the feedstock may be injected in an amount of from about 30% to about 85%, by weight, at point 32, and the remainder of the total amount of from about 15% to about 70%, by weight, injected at point 34. Preferably from about 50% to about 65% of the total amount of feedstock, by weight, is introduced at point 32, and the remainder of the total amount of feedstock, from about 35% to about 50%, by weight, is introduced at point 34. In each of the examples described herein carbon black-yielding feedstock 30, was injected radially in the form of a plurality of jets which penetrate into the interior regions of the hot combustion gas stream to insure a high rate of mixing and shearing of the hot combustion gases and the carbon black-yielding feedstock so as to rapidly and completely decompose and convert the feedstock to the novel carbon black of the present invention.

The mixture of carbon black-yielding feedstock and hot combustion gases flows downstream through zone 12 into zone 18. Quench 40, located at point 42, injecting quenching fluid 50, which in Examples 1-2 is water, is utilized to stop pyrolysis of the carbon black-yielding feedstock when the novel carbon blacks of the present invention are formed. Point 42 may be determined in any manner known to the art, for selecting the position of a quench to stop pyrolysis. One method for determining the position of the quench to stop pyrolysis is by determining the point at which an acceptable toluene extract level for the novel carbon blacks of the present invention is achieved. Toluene extract level may be measured by using ASTM Test D1618-83 "Carbon Black Extractables-Toluene Discoloration". Q is the distance from the beginning of zone 18 to quench point 42, and will vary according to the position of the quench.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

The following testing procedures are used in the determination and evaluation of the analytical properties of the carbon blacks of the present invention, and the physical properties of the rubber compounds incorporating the carbon blacks of the present invention.

CTAB of the carbon blacks was determined according to ASTM Test Procedure D3765-85. Tinting strength (Tint) of the carbon blacks was determined according to ASTM Test Procedure D3265-85a. The DBP (di-butyl phthalate adsorption value) of the carbon black was determined according to the procedure set forth in ASTM D2414. The CDBP of the carbon black was determined according to the procedure set forth in ASTM D 3493-86. $N_2SA$ (nitrogen surface area) of the carbon blacks was determined according to ASTM D3037-88. $I_2No.$ (iodine adsorption number) of the carbon blacks was determined according to ASTM D1510.

In order to determine Skewness $D_c$ and Skewness $P_s$ it is essential to determine certain parameters of carbon black aggregate morphology through the use of electron microscopy and image analysis.

The procedure for electron microscopy follows exactly, the method, "Standard Test Method for Carbon Black-Primary Aggregate Dimensions from Electron Microscope Image Analysis" ASTM Standard D-3849-87. The definitions of "Area" and "Perimeter" are contained in Section 11, Calculations, of D-3849. The "Diameter of an Equivalent Circle" ($D_c$) is a geometric transform of the Area measurement, and is defined as and calculated by:

$$D_c = \sqrt{Area/\pi}$$

The calculation of particle size ($P_s$) is given in section 11.2.2 of D-3849.

The unique distribution of values for $D_c$ and $P_s$ of carbon black aggregates are then characterized by the statistical parameter of Skewness. Skewness measures the degree of asymmetry around a sample mean value. A Skewness value close to zero indicates a symmetrical distribution of values around the mean. A positive value for Skewness indicates that the data is spread out to values larger than the mean, with a larger value indicating a greater spread. The equation by which Skewness is calculated is:

$$\frac{\sum_{i=1}^{N}(X_i - \bar{X})^3}{(N-1)(N-2)S^3/N}$$

where $$\bar{X} = MEAN = \sum_{i=1}^{N} X_i/N$$

$$S = STANDARD\ DEVIATION = \sqrt{VARIANCE/N}$$

$$VARIANCE = \sum_{i=1}^{N}(X_i - \bar{X})^2/N - 1$$

$N$ = NUMBER OF OBSERVATIONS

-continued $X_i$ = $i$TH OBSERVATION OF PARAMETER $X$

The abrasion data of the rubber compounds were determined using an abrader which is based on a Lambourn type machine. Abrasion rates (cubic centimeter/centimeter travel) were measured at 13% and 21% slip. The slip is based on the relative velocity between the sample wheel and grindstone. In the following examples, the abrasion index is the ratio of the abrasion rate of a control compound containing VULCAN ® J carbon black, a trademarked product of Cabot Corporation, Boston, Mass. divided by the abrasion rate of a compound produced using a specified carbon black of the present invention, at the same slip.

The modulus, tensile and elongation of the rubber compounds were measured by the procedure set forth in ASTM D412.

The Shore A Hardness of the rubber compounds was determined according to the procedure set forth in ASTM D-2240-86.

Rebound data were determined on all rubber samples utilizing a ZWICK Rebound Resilience Tester, Model 5109, manufactured by Zwick of America, Inc., Post Office Box 997, East Windsor, Conn. 06088. Instructions for determining the rebound values accompany the instrument.

The effectiveness and advantages of the present invention will be further illustrated by the following examples.

EXAMPLES 1-2

Two examples of the novel carbon blacks of the present invention were prepared in a reactor generally described herein, and as depicted in FIG. 1, utilizing the reactor conditions and geometry set forth in Table 2. The fuel utilized in the combustion reaction in each of the examples was natural gas. The liquid feedstock utilized in each of the examples had the properties indicated in Table 1 below:

TABLE 1

| Feedstock Properties | Example 1 | Example 2 |
|---|---|---|
| Hydrogen/Carbon Ratio | 0.97 | 0.97 |
| Hydrogen (wt. %) | 7.42 | 7.42 |
| Carbon (wt. %) | 91.4 | 91.4 |
| Sulfur (wt. %) | 0.6 | 0.6 |
| A.P.I. Gravity 15.6/15.6 C(60)F [ASTM D-287] | −1.9 | −1.9 |
| Specific Gravity 15.5/15.6 C(60)F [ASTM D-287] | 1.092 | 1.092 |
| Viscosity, SUS (54.4° C.) [ASTM D-88] | 103.4 | 103.4 |
| Viscosity, SUS (98.9° C.) [ASTM D-88] | 40.9 | 40.9 |
| BMCI (Visc-Grav) | 13.3 | 13.3 |

The reactor conditions and geometry are set forth in Table 2 below.

TABLE 2

| | CARBON BLACKS | |
|---|---|---|
| | Ex. 1 | Ex. 2 |
| D-1, in. | 7.25 | 7.25 |
| D-2, in. | 5.3 | 5.3 |
| D-3, in. | 9 | 9 |
| L-1, in. | 24 | 24 |
| L-2, in. | 12 | 12 |
| L-3, in. | 9 | 9 |
| F-1, in. | 5.75 | 5.75 |
| F-2, in. | 34 | 34 |
| Q, in. | 38 | 38 |
| Oil Inj. Pt. 32, ) Tips # × Size, in.) | 6 × 0.026 | 6 × 0.035 |
| Oil Rate 32, gph | 80 | 113 |
| Oil Press. 32, psig | 220 | 155 |
| Oil Preheat, 32, °F. | 300 | 280 |
| Oil Inj. Pt. 34, ) Tips # × Size, in.) | 3 × 0.070 | 3 × 0.040 |
| Oil Rate 34, gph | 67 | 34 |
| Oil Press. 34, psig | 165 | 72 |
| Oil Preheat 34, °F. | 230 | 230 |
| Comb. Air, kscfh | 110 | 110 |
| Comb. Air Preheat, °F. | 900 | 900 |
| Natural Gas, kscfh | 9.3 | 9.3 |
| Air/Burn Gas Ratio | 9.9 | 9.9 |
| K+, gK+/100 gal oil | 0 | 0 |
| Quench Press., psi | 130 | 130 |
| Temp. at Quench, °F. | 1350 | 1350 |

Inj. = Injection; Comb. = combustion; Press. = pressure
32 = Point 32 on FIG. 1; 34 = Point 34 on FIG. 1; gph = gallons/hour; psi = pounds/square inch; in. = inches; ft. = feet; °F. = degrees Fahrenheit; kscfh = standard cubic feet/hour, in 1000's
K+ = potassium; gK+/100 gal oil = grams K+/100 gallons feedstock (oil)

The carbon blacks produced in Examples 1-2 were then analyzed according to the procedures described herein. The analytical properties of the blacks produced, after wet pelletizing and drying, and of control carbon blacks are shown in Table 3:

TABLE 3

| | Carbon Blacks | | | |
|---|---|---|---|---|
| | Ex. 1 | Ex. 2 | VULCAN ® J | VULCAN ® 7H |
| CTAB (m²/g) | 102 | 117 | 95 | 120 |
| I₂No. (mg/g) | 103 | 117 | 90 | 120 |
| N₂SA (m²/g) | 111 | 123 | 100 | 121 |
| DBP (cc/100 g) | 143 | 143 | 114 | 125 |
| CDPB (cc/100 g) | 113 | 112 | 96 | 100 |
| Tint (%) | 107 | 120 | 116 | 126 |
| Tint/CTAB | 1.05 | 1.03 | 1.22 | 1.05 |
| Skewness $D_c$ | 1.60 | 1.57 | 0.93 | 0.91 |
| Skewness $P_s$ | 1.25 | 1.20 | 0.81 | 0.77 |

VULCAN ® J = VULCAN ® J Carbon Black
VULCAN ® 7H = VULCAN ® 7H Carbon Black
VULCAN ® is a registered trademark for carbon blacks manufactured and sold by Cabot Corporation, Boston, Massachusetts.

EXAMPLE 3

This Example illustrates the use of the novel carbon blacks of the present invention in regular passenger tire model rubber compounds in comparison with the same compounds containing VULCAN ® J carbon black and VULCAN ® 7H carbon black. Rubber compound A was made with the carbon black of the present invention produced in Example 1. Rubber compound B was made with the carbon black of the present invention produced in Example 2. Rubber compound C was made with VULCAN ® J carbon black. Rubber compound D was made with VULCAN ® 7H carbon black. Rubber compounds A, B, C and D were prepared utilizing each of the carbon black samples according to the regular passenger tire model rubber compound formulation shown below in Table 4.

TABLE 4

REGULAR PASSENGER TIRE MODEL RUBBER COMPOUND FORMULATION

| INGREDIENT | Part by weight |
|---|---|
| NS 112, SSBR | 100 |
| Carbon Black | 50 |
| Zinc Oxide | 3 |

TABLE 4-continued
REGULAR PASSENGER TIRE MODEL RUBBER COMPOUND FORMULATION

| INGREDIENT | Part by weight |
|---|---|
| Stearic Acid | 2 |
| Flexzon 7L | 1 |
| N-cyclohexyl-2-benzothiazolesulfenamide | 1.25 |
| 2-mercaptobenzothiazole | 0.25 |
| Sulfur | 1.75 |

NS 112, SSBR is a polymer having a microstructure of 15% styrene, 35% vinyl (1,2 butadiene), and 50% 1,4 butadiene produced and sold by Nippon Zeon Company, Ltd., Japan.
Flexzon 7L is a phenylene diamine antioxidant produced and sold by Uniroyal Chemical Company, Middlebury, Connecticut.

The properties of these rubber compounds were then evaluated according to the ASTM procedures described herein. The results were as shown in Table 5:

TABLE 5

| Rubber Compound | Modulus 300% (psi) | Tensile Strength (psi) | $E_b$* (%) | Shore A Hardness |
|---|---|---|---|---|
| A | 3134 | 3461 | 324 | 72 |
| B | 3268 | 3448 | 313 | 73 |
| C | 2633 | 3179 | 344 | 70 |
| D | 2623 | 3375 | 360 | 71 |

*$E_b$ = elongation at break; psi = pounds/square inch

These results show that rubber compounds A and B produced with the carbon blacks of the present invention and rubber compounds C and D produced with the control carbon blacks are suitable for use as regular passenger tires.

The abrasion index and rebound value of each rubber compound was also determined as described herein. The results were as shown in Table 6:

TABLE 6

| Rubber Compound | 13% Slip (%) | 21% Slip (%) | Rebound at 70° C. (%) |
|---|---|---|---|
| A | 114 | 124 | 66.4 |
| B | 146 | 133 | 64.2 |
| C | 100 | 100 | 66.3 |
| D | 126 | 116 | 63.4 |

Figure 2:
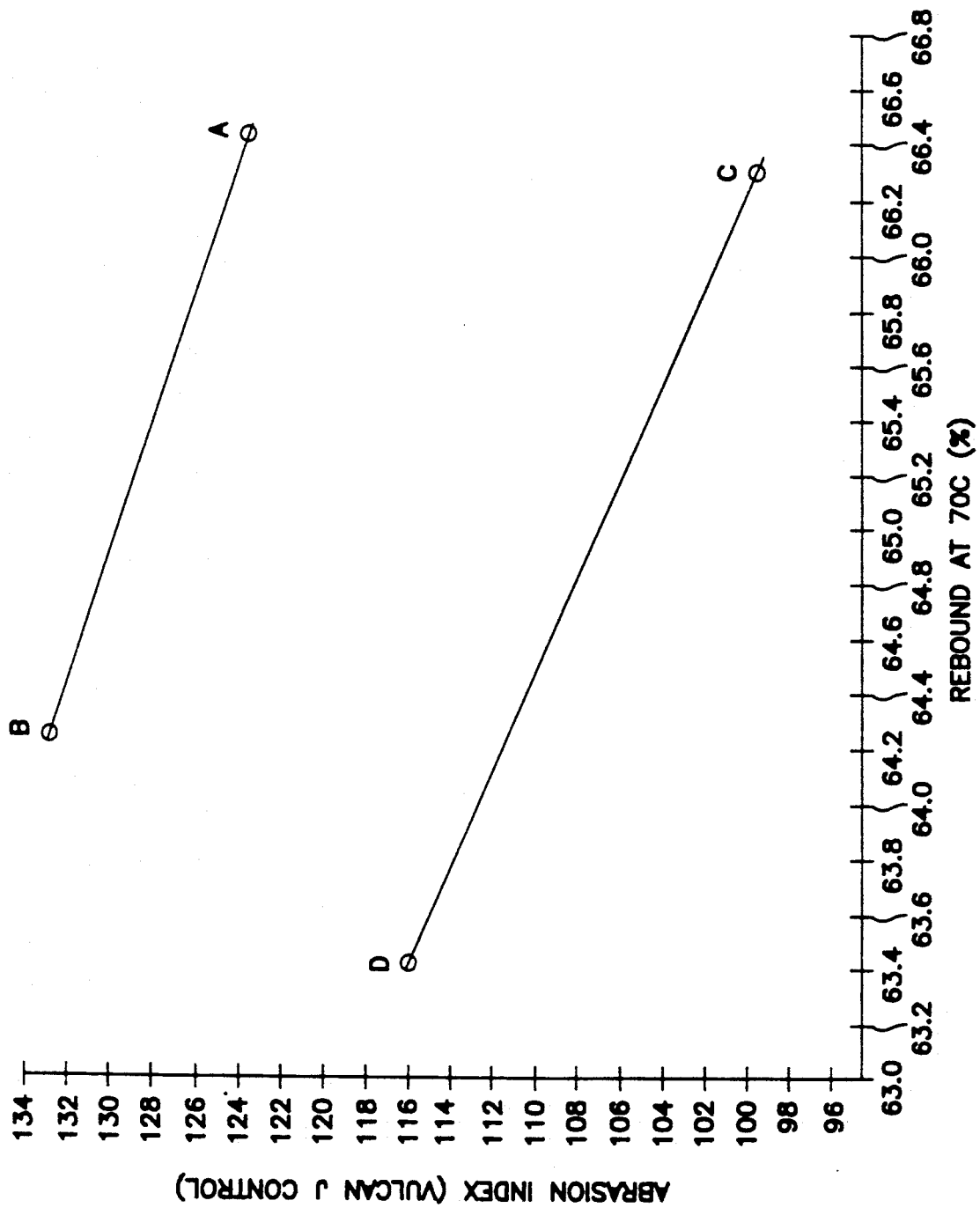
FIG. 2 is a graph of Laboratory Abrasion Index at 21% Slip versus rebound for regular passenger tire model compounds produced utilizing the carbon blacks of the present invention and for the same compounds produced with control carbon blacks.

The performance advantages of utilizing the carbon blacks of the present invention in regular passenger tire rubber compounds is clearly demonstrated by the results shown in Table 6 and depicted graphically in FIG. 2. FIG. 2 is a graph of the abrasion index at 21% slip versus rebound of regular passenger tire compounds A—D. As shown graphically in FIG. 2, the abrasion index versus rebound data for rubber compounds A and B, containing the carbon blacks of the present invention, exhibit increased abrasion resistance at the same rebound values in comparison with rubber compounds C and D incorporating the control carbon blacks. Thus rubber compounds A and B, containing the carbon blacks of the present invention, would be advantageous for use as tires that would have longer tread life and reduced rolling resistance.

EXAMPLE 4

This Example illustrates the use of the novel carbon blacks of the present invention in passenger high performance tire rubber compounds in comparison with the same compounds containing VULCAN® J carbon black and VULCAN® 7H carbon black. Rubber compound E was made with the carbon black of the present invention produced in Example 1. Rubber compound F was made with the carbon black of the present invention produced in Example 2. Rubber compound G was made with VULCAN® J carbon black. Rubber compound H was made with VULCAN® 7H carbon black. Rubber compounds E, F, G and H were prepared utilizing each of the carbon black samples according to the passenger high performance tire model rubber formulation shown below in Table 7.

TABLE 7
PASSENGER HIGH PERFORMANCE TIRE MODEL RUBBER FORMULATION

| INGREDIENT | Part by weight |
|---|---|
| SL-574, SSBR | 100 |
| Carbon Black | 80 |
| Sundex 790 Oil | 40 |
| Zinc Oxide | 3 |
| Stearic Acid | 2 |
| Flexzon 7L | 1 |
| N-cyclohexyl-2-benzothiazolesulfenamide | 1.40 |
| Sulfur | 1.75 |

SL-574, SSBR is a polymer having a microstructure of 15% styrene, 57% vinyl (1,2 butadiene) and 28% 1,4 butadiene, manufactured and sold by Japan Synthetic Rubber Company, Japan.
Sundex 790 Oil is an ASTM D2226, Type 101 oil
Flexzon 7L is described in Example 3.

The properties of these rubber compounds were then evaluated according to the ASTM procedures described herein. The results were as shown in Table 8:

TABLE 8

| Rubber Compound | Modulus 300% (psi) | Tensile Strength (psi) | $E_b$* (%) | Shore A Hardness |
|---|---|---|---|---|
| E | 1901 | 2605 | 417 | 71 |
| F | 1649 | 2635 | 474 | 71 |
| G | 1294 | 2602 | 548 | 64 |
| H | 1232 | 2660 | 578 | 65 |

*$E_b$ = elongation at break; psi = pounds/square inch

These results show that rubber compounds E and F produced with the carbon blacks of the present invention, and rubber compounds G and H produced with the control carbon blacks, are suitable for use as passenger high performance tires.

The abrasion index and rebound value of each rubber compound was also determined as described herein. The results were as shown in Table 9:

TABLE 9

| Rubber Compound | 13% Slip (%) | 21% Slip (%) | Rebound at 70° C. (%) |
|---|---|---|---|
| E | 102 | 130 | 46.8 |
| F | 108 | 146 | 42.4 |
| G | 100 | 100 | 43.4 |
| H | 107 | 118 | 40.8 |

Figure 3:
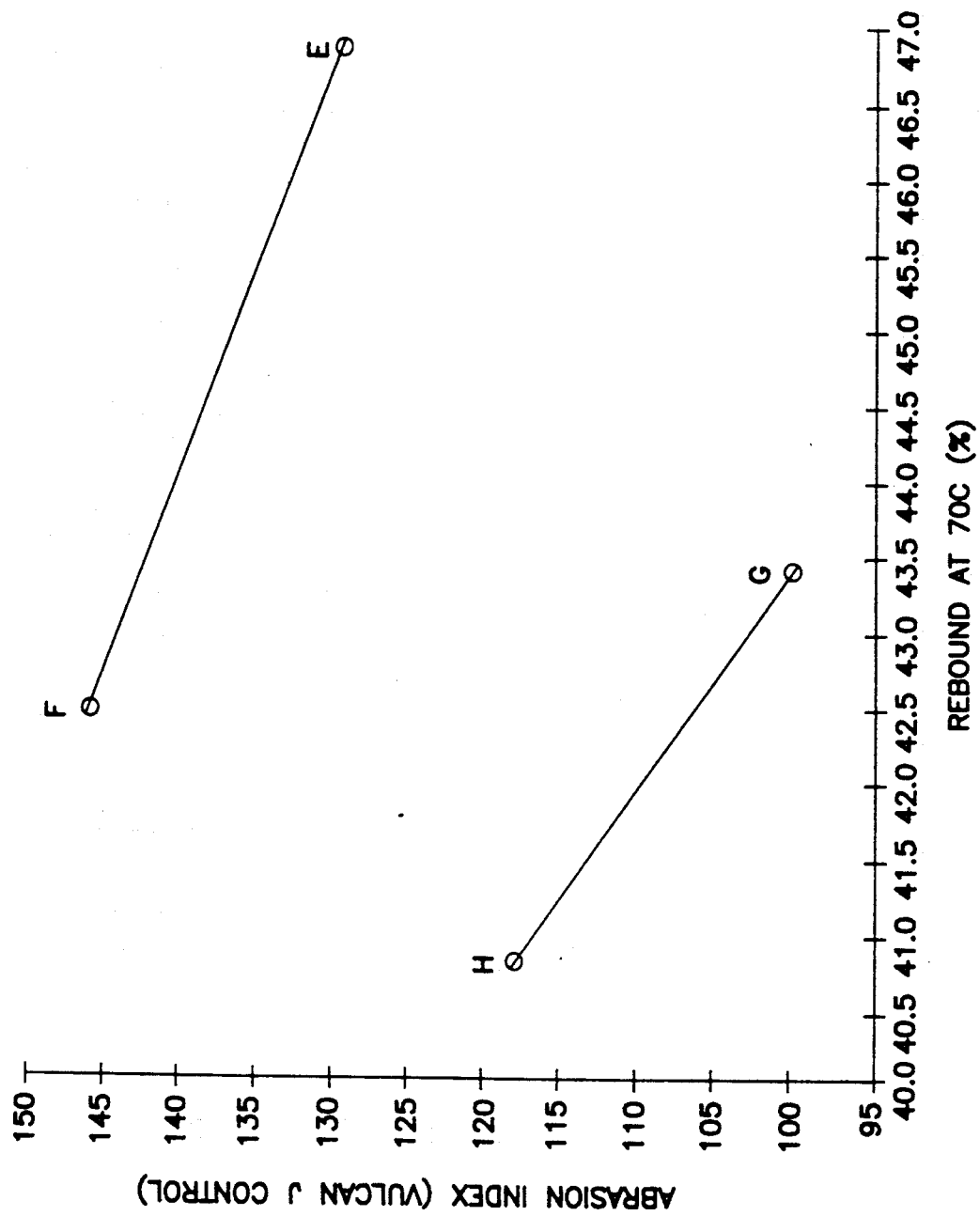
FIG. 3 is a graph of Laboratory Abrasion Index at 21% Slip versus rebound for passenger high performance tire model compounds produced utilizing the carbon blacks of the present invention and for the same compounds produced with control carbon blacks.

The performance advantages of utilizing the carbon blacks of the present invention in passenger high performance tire rubber compounds is clearly demonstrated by the results shown in Table 9 and depicted graphically in FIG. 3. FIG. 3 is a graph of the abrasion index at 21% slip versus rebound of rubber compounds E-H. As shown graphically in FIG. 3, the abrasion index versus, rebound data for rubber compounds E and F, containing the carbon blacks of the present invention, exhibit increased abrasion resistance at the same rebound values in comparison with rubber compounds G and H incorporating the control carbon blacks. Thus rubber compounds E and F, containing the carbon blacks of the present invention, would be advantageous for use in passenger high performance tires that would have longer tread life and reduced rolling resistance.

It should be clearly understood that the forms of the present invention herein described are illustrative only and are not intended to limit the scope of the invention.

We claim:

1. A carbon black having a CTAB of 95–120 m$^2$/g, a CDBP of 106–120 cc/100 g, a Tint/CTAB ratio of 0.90–1.10, a Skewness $D_c$ of 1.30–1.80 and a Skewness $P_s$ of 1.00–1.50.

2. The carbon black of claim 1 wherein the CTAB is 100–118 m$^2$/g, the CDBP is 110–115 cc/100 g, the Tint/CTAB ratio is 0.95–1.06, the Skewness $D_c$ is 1.40–1.70 and the Skewness $P_s$ is 1.10–1.40.

3. The carbon black of claim 1 wherein the CTAB is 100–105 m$^2$/g, the CDBP is 110–115 cc/100 g, the Tint/CTAB ratio is 1.0–1.1, the Skewness $D_c$ is 1.50–1.70 and the Skewness $P_s$ is 1.15–1.35.

4. The carbon black of claim 1 wherein the CTAB is 114–120 m$^2$/g, the CDBP is 109–115 cc/100 g, the Tint/CTAB ratio is 1.0–1.06, the Skewness $D_c$ is 1.47–1.67 and the Skewness $P_s$ is 1.10–1.30.

5. The carbon black of claim 2 wherein the CTAB is 102 m$^2$/g, the CDBP is 113 cc/100 g, the Tint/CTAB ratio is 1.05, the Skewness $D_c$ is 1.60 and the Skewness $P_s$ is 1.25.

6. The carbon black of claim 2 wherein the CTAB is 117 m$^2$/g, the CDBP is 112 cc/100 g, the Tint/CTAB ratio is 1.03, the Skewness $D_c$ is 1.57 and the Skewness $P_s$ is 1.20.

7. A rubber composition comprising about 100 parts, by weight, of a rubber and from about 10 to about 250 parts, by weight, of a carbon black having a CTAB of 95–120 m$^2$/g, a CDBP of 106–120 cc/100 g, a Tint/CTAB ratio of 0.90–1.10, a Skewness $D_c$ of 1.30–1.80 and a Skewness $P_s$ of 1.00–1.50.

8. The rubber composition of claim 7 wherein the CTAB of the carbon black is 100–118 m$^2$/g, the CDBP of the carbon black is 110–115 cc/100 g, the Tint/CTAB ratio of the carbon black is 0.95–1.06, the Skewness $D_c$ of the carbon black is 1.40–1.70 and the Skewness $P_s$ of the carbon black is 1.10–1.40.

9. The rubber composition of claim 7 wherein the CTAB of the carbon black is 100–105 m$^2$/g, the CDBP of the carbon black is 110–115 cc/100 g, the Tint/CTAB ratio of the carbon black is 1.0–1.1, the Skewness $D_c$ of the carbon black is 1.50–1.70 and the Skewness $P_s$ of the carbon black is 1.15–1.35.

10. The rubber composition of claim 7 wherein the CTAB of the carbon black is 114–120 m$^2$/g, the CDBP of the carbon black is 109–115 cc/100 g, the Tint/CTAB ratio of the carbon black is 1.0–1.06, the Skewness $D_c$ of the carbon black is 1.47–1.67 and the Skewness $P_s$ of the carbon black is 1.10–1.30.

* * * * *